United States Patent

Wallace

[15] 3,648,848
[45] Mar. 14, 1972

[54] EMERGENCY FLARE HOLDER

[72] Inventor: Joseph M. Wallace, 5898 Blackwelder St., Culver City, Calif. 90230

[22] Filed: May 4, 1970

[21] Appl. No.: 34,469

[52] U.S. Cl. ................................................211/88, 108/42
[51] Int. Cl. .............................................................A47f 5/08
[58] Field of Search ................211/88, 87, 120, 68, 69, 69.8; 108/42

[56] References Cited

UNITED STATES PATENTS

| | | | |
|---|---|---|---|
| 2,592,467 | 4/1952 | Reeves | 211/88 X |
| 1,966,648 | 7/1934 | Ryberg | 222/183 |
| 2,832,498 | 4/1958 | Parsons | 211/88 X |
| 629,840 | 8/1899 | Wundes | 217/9 |
| 2,518,989 | 8/1950 | Haslup | 21/69.8 |
| 2,825,467 | 3/1958 | Fernly | 211/120 X |

Primary Examiner—Nile C. Byers, Jr.
Attorney—Frederic B. Schramm

[57] ABSTRACT

A holder for emergency highway flares to be mounted in the driver's compartment of a vehicle is formed of sheet material bent to form a container with an open front, with sidewalls cut away at the upper end to enable the emergency highway flares mounted in the container to be grasped and taken out.

2 Claims, 3 Drawing Figures

PATENTED MAR 14 1972
3,648,848
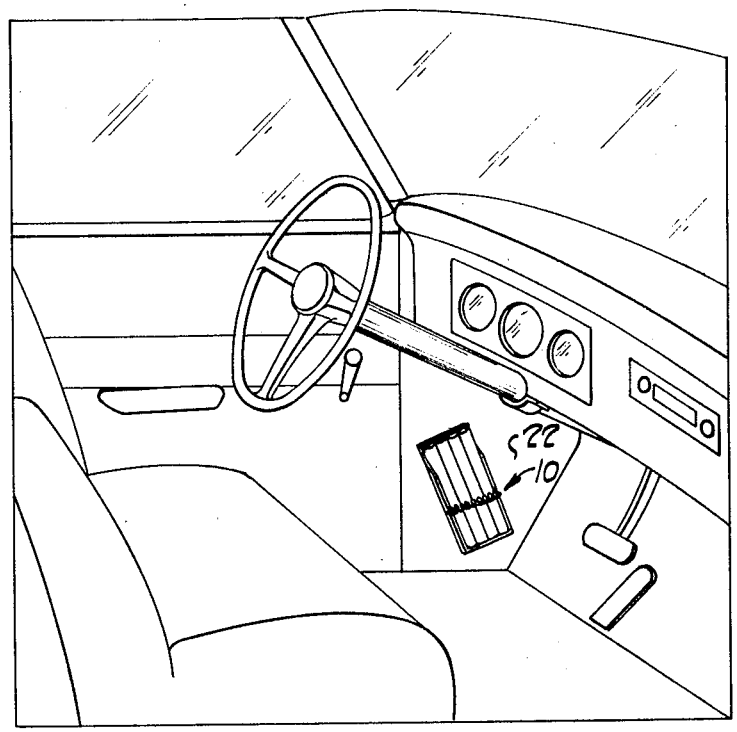
Fig. 1
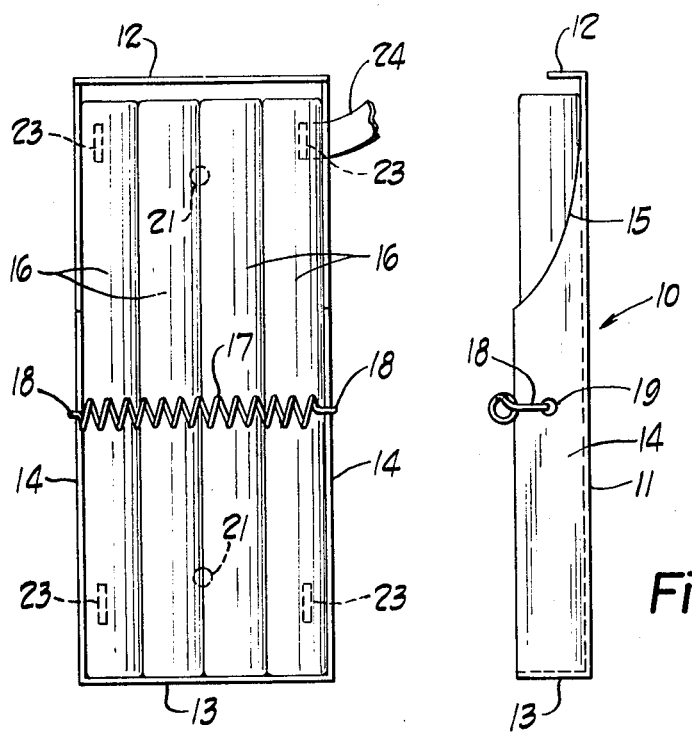
Fig. 2
Fig. 3
INVENTOR.
JOSEPH M. WALLACE
BY Frederic B. Schramm
ATTORNEY.

EMERGENCY FLARE HOLDER

BRIEF SUMMARY OF THE INVENTION

The invention relates to providing emergency highway flares readily accessible in a vehicle such as a pickup truck or camper and has for its principal object securing such flares in the driver's compartment of the vehicle in such a manner that they will always be available and accessible and may readily be removed when needed.

In carrying out the invention in accordance with a preferred form thereof, a container is formed of sheet metal of such size as to hold a predetermined number of highway flares of standard size, for example, four (4) flares. The container is made with an open front with holes on either side having springs stretched between the holes to hold flares in place. Mounting holes are provided for enabling the flare holder to be fastened to the sidewall of the driver's compartment of the vehicle.

A better understanding of the invention will be afforded by the following detailed description considered in conjunction with the accompanying drawing.

DRAWINGS

In the drawing:

FIG. 1 is a perspective view of the interior of the driver's compartment of a vehicle such as a camper or a pickup truck showing the emergency flare holder mounted in place.

FIG. 2 is a plan view of the flare holder illustrated in FIG. 1, and

FIG. 3 is a side view of the embodiment of FIG. 2.

DETAILED DESCRIPTION

As shown in FIGS. 2 and 3 the highway flare holder comprises a sheet of material 11 of plastic or metal with upper and lower ends 12 and 13 extending forward, the upper end 12 not extending as far forward as the lower end 13. Sides 14 extending forward are also formed. They may be formed by bending up the edges in the case of sheet metal. However, the upper portions 15 of the sides are cut away so as to enable any of the emergency flares 16 to be grasped and be removed when desired. The dimensions of the container are such as to receive standard highway flares approximately 9½ inches in length and three-fourths to seven-eighths inches in diameter. In the embodiment illustrated the width of the container is such as to receive four flares 16.

In order to retain the flares in place, resilient restraining means are provided such as a tension coil spring 17 having end portions formed as hooks 18 inserted in openings provided in the sidewalls 14.

In order that the emergency highway flares will always be at hand when needed, provision is made for mounting the container 10 in the cab of the truck or the driver's compartment of a camper or other type of recreational vehicle, within arm's reach of the driver. In this manner the danger of the flares being misplaced in the load or in the luggage is avoided. Preferably the container is mounted somewhat diagonally as shown in FIG. 1 on the interior of the sidewall of the vehicle where it may readily be reached by the driver and a flare may readily be removed when needed. To this end, mounting holes 21 are formed in the back of the container 10 to receive suitable mounting screws engaging the wall 22 of the vehicle.

Alternatively in a vehicle having a sufficiently long steering post, the emergency flare holder 10 may be secured to the steering post by straps 24 passing through slots 23 in the back of the container.

While the invention has been described as embodied in concrete form and as operating in a specific manner in accordance with the provisions of the Patent Statutes, it should be understood that the invention is not limited thereto, since various modifications will suggest themselves to those skilled in the art without departing from the spirit of the invention.

What is claimed is:

1. An emergency highway flare holder comprising rigid sheet material with a lower end extending forward to form a bottom rest for highway flares and sides extending forward to form sidewalls providing side restraints for highway flares, the upper portions of the sidewalls being cut away to provide access to flares, a spring resiliently restraining highway flares in the holder, the sidewalls being curved to conform substantially to the shape of cylindrical flares having a diameter fractionally less than the distance the sides extend forwardly and each sidewall having an opening therein spaced from the back edge of the sidewall substantially half the distance that the sidewall extends forwardly, said spring comprising a tension spring composed of coiled wire with the wire bent to form hooks at the end engaging said openings in the sidewalls of the flare holder, the sheet material forming the flare holder extending forward at the upper end for a distance less than at the lower end to provide an upward restraint for highway flares without limiting the ready removal thereof, the rigid sheet material being provided with slots near the edges of the upper and lower ends for receiving securing straps.

2. An emergency highway flare holder comprising rigid sheet material with a lower end extending forward to form a bottom rest for highway flares and sides extending forward to form sidewalls providing side restraints for highway flares, the upper portions of the sidewalls being cut away to provide access to flares, a spring resiliently restraining highway flares in the holder, the sidewalls being curved to conform substantially to the shape of cylindrical flares having a diameter fractionally less than the distance the sides extend forwardly and each sidewall having an opening therein spaced from the back edge of the sidewall substantially half the distance that the sidewall extends forwardly, said spring comprising a tension spring composed of coiled wire with the wire bent to form hooks at the end engaging said openings in the sidewalls of the flare holder, the sheet material forming the flare holder extending forward at the upper end for a distance less than at the lower end to provide an upward restraint for highway flares without limiting the ready removal thereof, the rigid sheet material being formed with fastening-screw-receiving openings therein located substantially centrally of said sidewalls.

* * * * *